(12) United States Patent
Peterseim

(10) Patent No.: US 6,216,840 B1
(45) Date of Patent: Apr. 17, 2001

(54) OPERATING DEVICE FOR A FRICTION CLUTCH

(75) Inventor: Michael Peterseim, Oberdorla (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/415,580

(22) Filed: Oct. 8, 1999

(30) Foreign Application Priority Data

Oct. 13, 1998 (DE) ............................................ 198 46 988

(51) Int. Cl.⁷ .................................................. F16D 23/14
(52) U.S. Cl. ........................................... 192/98; 192/99 S
(58) Field of Search .................................. 192/98, 99 S, 192/91 R

(56) References Cited

U.S. PATENT DOCUMENTS

| | | | | |
|---|---|---|---|---|
| 3,913,714 | * | 10/1975 | Camp ................................. | 192/99 S |
| 4,557,361 | * | 12/1985 | Nix et al. ........................ | 192/91 R X |
| 4,585,107 | * | 4/1986 | Leigh-Monstevens ............. | 192/98 X |
| 4,883,154 | * | 11/1989 | Drewes et al. ........................... | 192/98 |
| 4,947,976 | * | 8/1990 | Limbacher ............................. | 192/98 |
| 5,113,988 | * | 5/1992 | Caron ................................... | 192/98 |
| 5,318,162 | * | 6/1994 | Maucher et al. ................... | 192/98 X |
| 6,024,201 | * | 2/2000 | Husse et al. ........................ | 192/99 S |
| 6,056,446 | * | 5/2000 | Welter et al. ....................... | 192/98 X |

* cited by examiner

Primary Examiner—Rodney H. Bonck
(74) Attorney, Agent, or Firm—Darby & Darby

(57) ABSTRACT

The invention relates to a release device for a friction clutch with a central release member. A release bearing 10, a sliding sleeve 9 and an annular flange 4 are combined together into a single assembly by a holding element 18a which holds the components together before the clutch is assembled. The holding element becomes redundant after assembly of the clutch. The element has tongues 20a which initially grip the sleeve 9 but which are released from the sleeve on assembly as a result of clamping the flange 4 against a gearbox housing 5.

13 Claims, 6 Drawing Sheets

OPERATING DEVICE FOR A FRICTION CLUTCH

The invention relates to a device with which a friction clutch of vehicles is to be operated and which is rotatably mounted between an internal combustion engine and a manual shift transmission. The device comprises a release bearing which is preferably supported on release levers of the friction clutch and which forms with a sliding sleeve a release unit. The device further includes a guide sleeve passing through the sliding sleeve and on which the release unit is axially displaceable and radially guided. Furthermore the device comprises a clutch lever for transferring operating forces of the clutch pedal to the release unit. In the installed state is the clutch lever is held for swivel movement in a locally fixed housing. All the component parts of the device are held safe against loss through a holding element to produce one structural unit.

A device of the structural type mentioned above is already known from U.S. Pat. No. 3,913,714. This device comprises a sliding sleeve which has at the end a radially aligned annular flange which is supported on a clutch lever. On the opposite side from the clutch lever the outer bearing ring of the release bearing is supported on the sliding sleeve. To this end the outer bearing ring is likewise provided with a radially aligned annular flange whose outer contour overlaps the annular flange of the sliding sleeve. By means of a spring which on one side engages in an end recess of the annular flange of the release bearing and on the other side is held in a recess of the clutch lever, the release unit—consisting of the sliding sleeve and release bearing—as well as the clutch lever are combined into one preassembled structural unit. The spring which is used as the holding means and is formed as a coil spring is thereby mounted radially outside on the clutch lever and thus increases the amount of structural space required. The spring protruding from the device furthermore demands extra care to be taken during fitting to ensure that a spring end is not lost. Furthermore the known holding means requires separate assembly which has a detrimental effect on costs.

Taking into account the drawbacks with the known device the object of the present invention is to provide an automatically operating holding means
- with which all the component parts of the device are held together
- which does not impede the assembling of the device; and
- which has no effect on the function in the installed position of the device.

This is achieved according to the invention by a disc-like holding element supported on an annular flange of the guide sleeve. The holding element is provided with at least one axially aligned protruding spring clip which engages behind a component part of the device. A holding element according to the invention of this kind has no effect on the radial shaping of the device, whose assembly is likewise not impeded by the holding means. The design of the holding means thereby provides spring clips whose configuration effectively holds together all the component parts of the device. In order to prevent the holding means, from affecting the function of the device in the installed state the securing or holding action of the spring clip becomes inoperative in the installation position.

Further advantageous designs of the invention are the subject of the claims.

An advantageous design of the invention proposes arranging the holding means so that in the installation position it is inserted between the annular flange of the guide sleeve and the gearbox housing on which the guide sleeve is fastened.

For the spring clip it is proposed that this has at the end an angled edge which during pre-assembly automatically snap fits with an elastic retaining nose mounted on a component part of the device. By way of example the spring clip can interact with the sliding sleeve. For this purpose the sliding sleeve is provided with an end-side radially set shoulder which is guided through a free area or inner bore of the clutch lever and has an elastic retaining nose. During pre-assembly the angled edge of the spring clip snap-fits on the retaining nose whereby the spring clip is guided through a free area in the annular flange of the guide sleeve.

As an alternative the invention comprises a holding element whose spring clip or spring clips engage over the annular flange of the guide sleeve and snap-fit by way of example on an edge zone of the clutch lever. A holding element designed in this way creates an exact alignment of the clutch lever relative to the guide sleeve prior to assembling the device and thus makes it easier to fit the device.

A further design of the holding element proposes that this is provided with at least two spring clips arranged off-set by 180°. The retaining element according to the invention can furthermore be provided with additional spring clips spread out preferably symmetrical over the circumference in order to ensure that all the component parts are securely held together in the pre-assembled state of the device, which is particularly advantageous in the case of a device whose component parts have a relatively high inherent weight.

The holding element according to the invention is preferably made from a strip metal material without any stock-removal work. The basic disc-like shape of the holding element can thereby be produced by punching from a sheet metal strip. To form the spring clips it is proposed providing in the foundation body of the disc-like holding element radial cuts arranged parallel to each other and starting from the outer edge zone or inner diameter to form sheet metal tabs. By bending the edges at right angles and shaping the edge at the end it is possible to create the spring clips out of the sheet metal tabs.

According to the invention the holding action of the spring clips becomes inoperative in the installed state of the device. For this purpose the spring clips are shaped so that they protrude axially at least in areas out from the contact bearing face of the holding element on the gearbox housing. This shaping of the spring clips causes an automatic release of the securing action of the holding element as soon as the device is fixed on the gearbox housing. When the holding element bears against the gearbox housing the axially protruding area of the spring clips is shifted and occupies a position coinciding with the contact bearing face of the holding element. In synchronisation with this movement the angled edge of the spring clip swivels radially outwards and therefore no longer engages with the retaining nose. This action can also be achieved with an alternative design of holding element where the spring clips engage round the annular flange of the guide sleeve on the outside. For a holding element of this kind it is proposed providing the spring clips from the point of attachment to the foundation body of the holding element with a section which is first angled and then extends up to the outer contour of the annular flange of the guide sleeve. This design creates an axial spacing between the holding element and the annular flange of the guide sleeve. The at first slightly angled area of the spring clip is adjoined by an axially aligned section having an angled end edge which interacts with keyed engagement with a component part of the device. When fitting the device the holding element comes to adjoin the annular flange of the guide sleeve. When this is moved the slightly angled section starting from the connecting point of the spring clips is likewise displaced into the contact bearing surface, connected with a swivel movement of the free end of the spring clip so that the positive locking engagement between the spring clip and a component part of the device is released.

A further design of the invention provides a holding element whose size corresponds to the support surface area of the annular flange of the guide sleeve. This measure avoids any radial overlap in the area of the annular flange of the guide sleeve which can have a detrimental effect on the fitting of the device.

In order to achieve position-orientated arrangement of the holding means relative to the guide sleeve the holding means is preferably provided with at least one axially aligned shoulder which is fitted into a corresponding free area or bore in the annular flange of the guide sleeve. This produces the desired centering of the holding means relative to the guide sleeve which makes it easier in particular to insert fixing screws into bores of the annular flange of the guide sleeve and the corresponding bores of the holding element.

A further design of the invention also comprises measures for securing the fixing means, more particularly fixing screws, with which the device is fixed on the gearbox housing. Particularly suitable for this are for example radial incisions made in the area of the receiving bore for the fixing screw and which allow the thread pitch to be deformed. As an alternative it is possible to provide the bore with radially aligned tongues which are arranged in a circle and whose inner diameter understeps the thread diameter of the screw and thus ensures a secure hold of the fixing means in the holding element.

Embodiments of the invention are shown in the drawings which will now be described in further detail.

Figure 7:
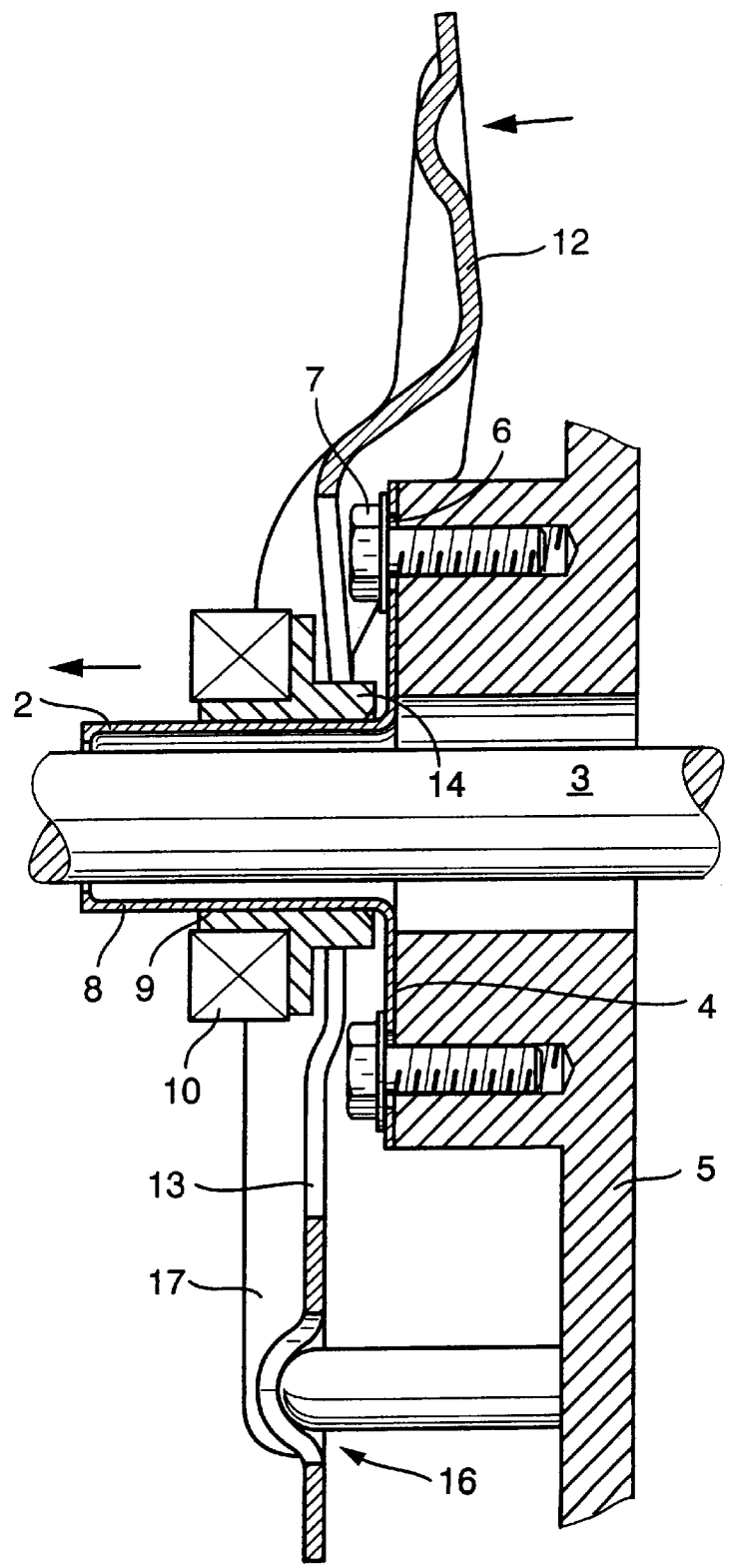
FIG. 7 is a sectional view of a prior art device for operating a friction clutch.

The invention will first be explained with reference to the device 1a illustrated in FIGS. 1a, 7, and 8. The device 1a is provided for operating a friction clutch 101 shown in FIG. 1a which is mounted inside a clutch bell between an internal combustion engine 102 and a manual shift transmission 103. With the device 1a it is possible to transfer the force exerted by a manually operated clutch pedal to the friction clutch 101. In a conventional construction the device 1a comprises a guide sleeve 2 which is coaxial with and surrounds with a radial spacing a drive shaft 3 which connects the internal combustion engine 102 to the transmission 103. At one end the guide sleeve 2 has an integral annular flange 4 which is supported at the end side on a collar of a gearbox housing 5. In order to fix the guide sleeve 2 the annular flange 4 is provided with bores 6 through which fixing screws 7 are screwed into the gearbox housing 5. A sliding sleeve 9 is displaceably guided on the sleeve face 8 of the guide sleeve 2 and serves as a support element for a release bearing 10. In the installation position of the device 1a the release bearing 10 is supported on release elements, i.e. release forks or a diaphragm of the friction clutch 101. Displacement of the release unit 11 formed by the sliding sleeve 9 and release bearing 10 is carried out by means of a clutch operating lever 12. A free area 13 in the clutch lever 12 is formed so that a shoulder 14 at the end of the sliding sleeve 9 is fitted therein. Displacement of the release unit in the direction of the arrow A can be triggered by a swivel movement of the clutch lever 12 as soon as the clutch lever bears on a shoulder 15 of the sliding sleeve 9. In order to achieve a swivel movement the clutch lever 12 is supported at one end for swivel movement by an articulated joint 16. Force is applied to the clutch lever 12 at the end remote from the articulated joint 16.

Figure 8:
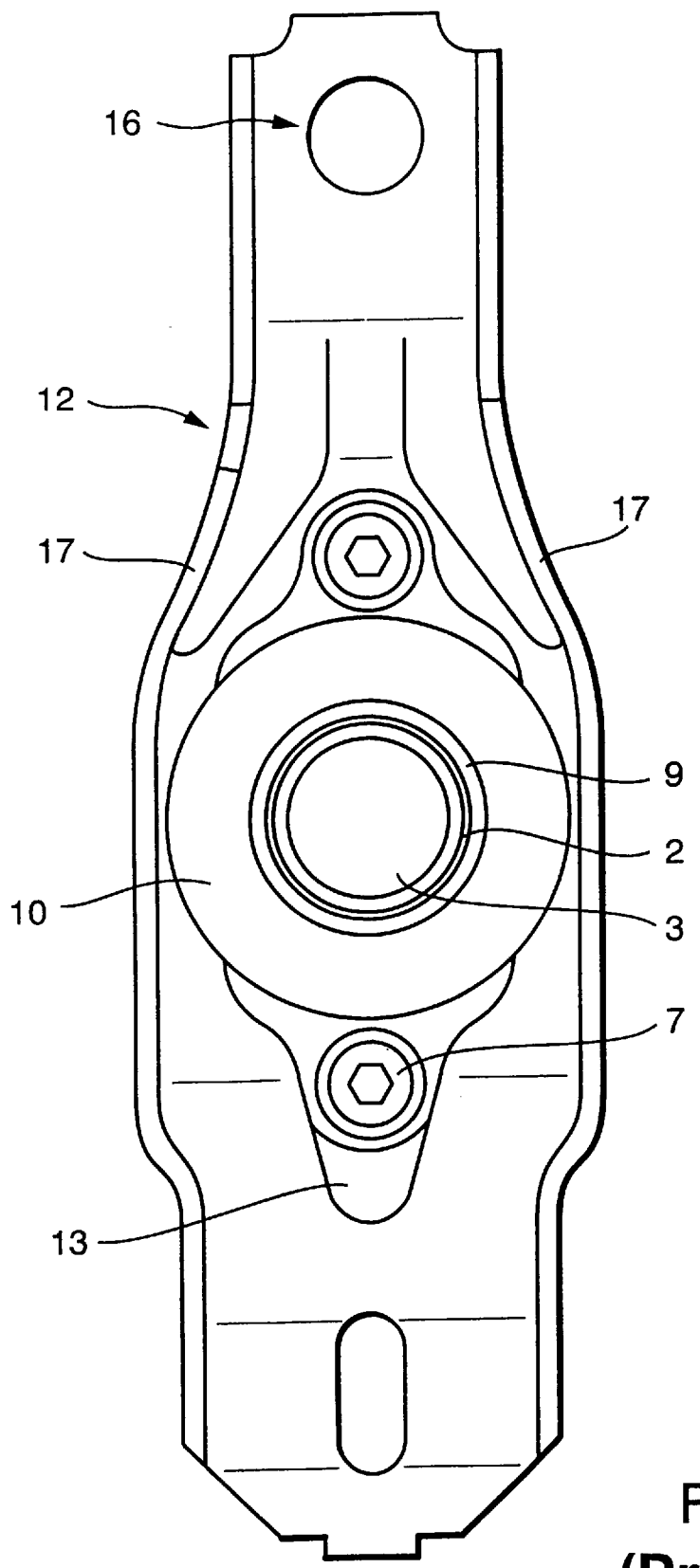
FIG. 8 is a front view of the device illustrated in FIG. 7.

The front view in FIG. 8 illustrates more clearly the individual component parts of the device 1a. Here the clutch lever 12 forms a substantially rectangular shaped foundation body which for reinforcement is provided on both sides with cheeks 17 facing towards the release bearing 10 to form a U-shaped profiled section which improves the strength of the clutch lever 12. The front view of the device 1a further shows the shape of the free area 13 in the clutch lever 12 which extends in some areas far enough radially to allow adequate access to the fixing screws 7.

FIGS. 1 to 4 show the devices 1b (FIGS. 1, 1a and 2) and 1c (FIGS. 3 and 4) in connection with holding elements 18a and 18b in the non-installed state and in the installed state. The component parts here which coincide with FIGS. 7 and 8 are provided with the same reference numerals so that for a detailed description reference is made to the explanations for FIG. 7.

Figure 1:
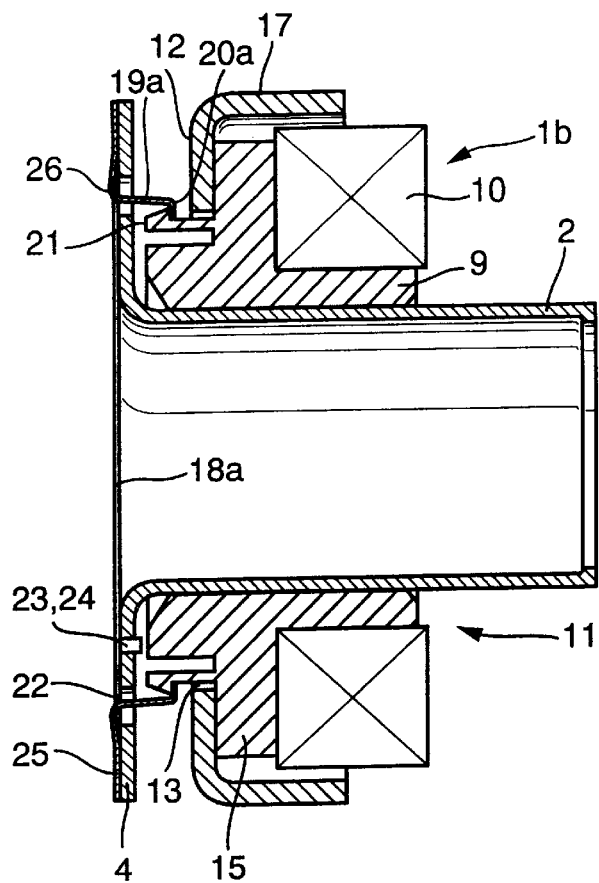
FIG. 1 shows a device whose individual parts are held together safe against loss by a holding element according to the invention.
Figure 1A:
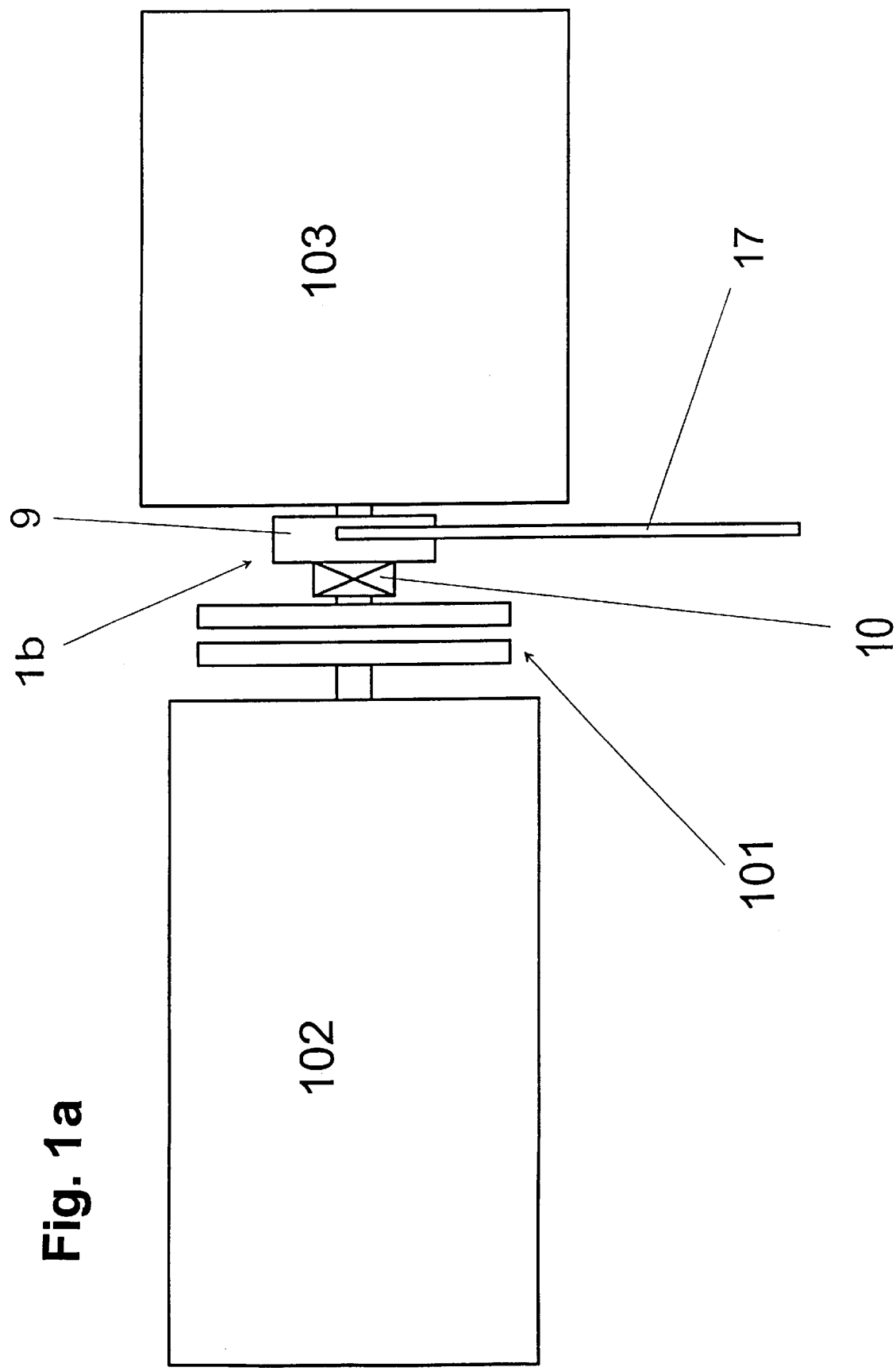
FIG. 1a shows an overview to illustrate where a device according to the invention is arranged in the drive train of a vehicle.

The holding element 18a shown in FIG. 1 is supported at the end on the annular flange 4 of the guide sleeve 2. Two spring clips 19a arranged opposite one another on the holding element 18a are guided through bores 22 in the annular flange 4 and each have at the end a radially inwardly aligned edge 20a. Each edge 20a snap fits with an elastically formed retaining nose 21 which axially adjoins the shoulder 15 of the sliding sleeve 9. The retaining nose 21 is guided through the free area 13 of the clutch lever 12 and extends close up to the annular flange 4 of the guide sleeve 2. The configuration of the retaining nose 21 is thereby made so that when axially fitting the holding element 18a, the retaining nose 21 yields radially inwards as a result of the elastic design and the outer incline of the retaining nose 21 extending towards the free end so that an automatic snap-fit connection takes place between the sliding sleeve 9 and the holding element 18a. Through this snap fit connection all the component parts of the device 1b are simultaneously brought together into one secure unit which is ready for operation. In order to achieve a position orientation the holding element 18a is centred on the annular flange 4 of the guide sleeve 2. To this end the holding element 18a is provided with at least one axially protruding shoulder 23 which is fitted into a bore 24 of the annular flange 4 This centering makes it possible to insert the fixing screws 7 (according to FIG. 7) into the annular flange 4 as well as into the corresponding bores in the holding element 18a without obstruction.

Figure 2:
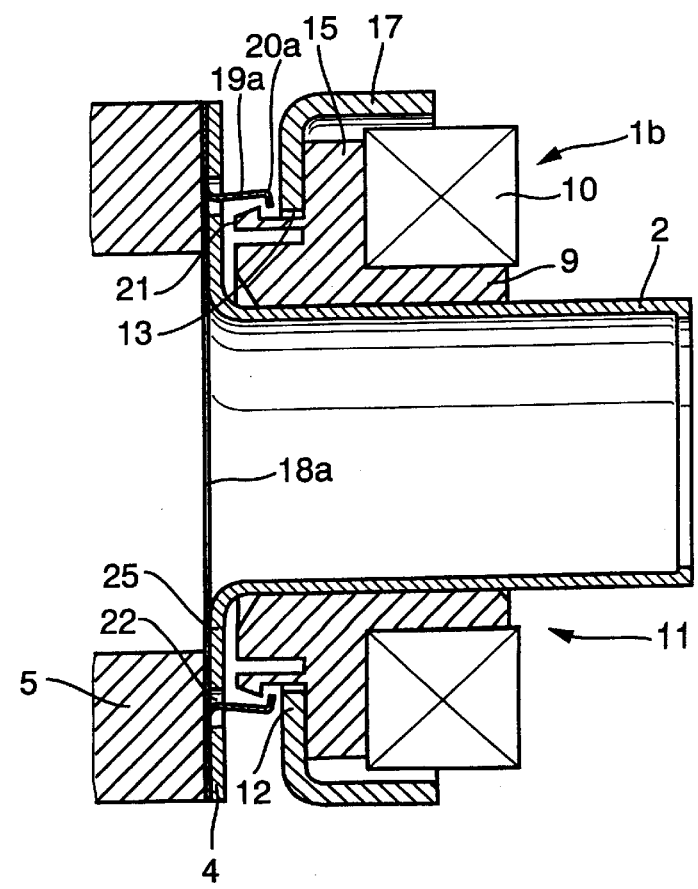
FIG. 2 shows the device illustrated in FIG. 1 in the installation position.

FIG. 2 shows the device 1b in the installed state. As opposed to FIG. 1 here in the installed position the release unit 11 is no longer fixed in position with the clutch lever 12 through the holding element 18a since the edge 20a is released from the retaining nose 21, i.e. does not engage behind same. This unlocking occurs as a result of the shaping of the spring clip 19a which has a section 26 which starting from the point of attachment on the holding element 18a first protrudes axially away from the contact bearing face 25 (see FIG. 1) and then runs into the oppositely axially aligned section of the spring clip 19a. In the installed position the section 26 is forced in the direction of the contact bearing face 25 and occupies a position aligned therewith, so that the oppositely axially aligned section is moved radially outwardly and lifted away from the nose 21.

Figure 3:
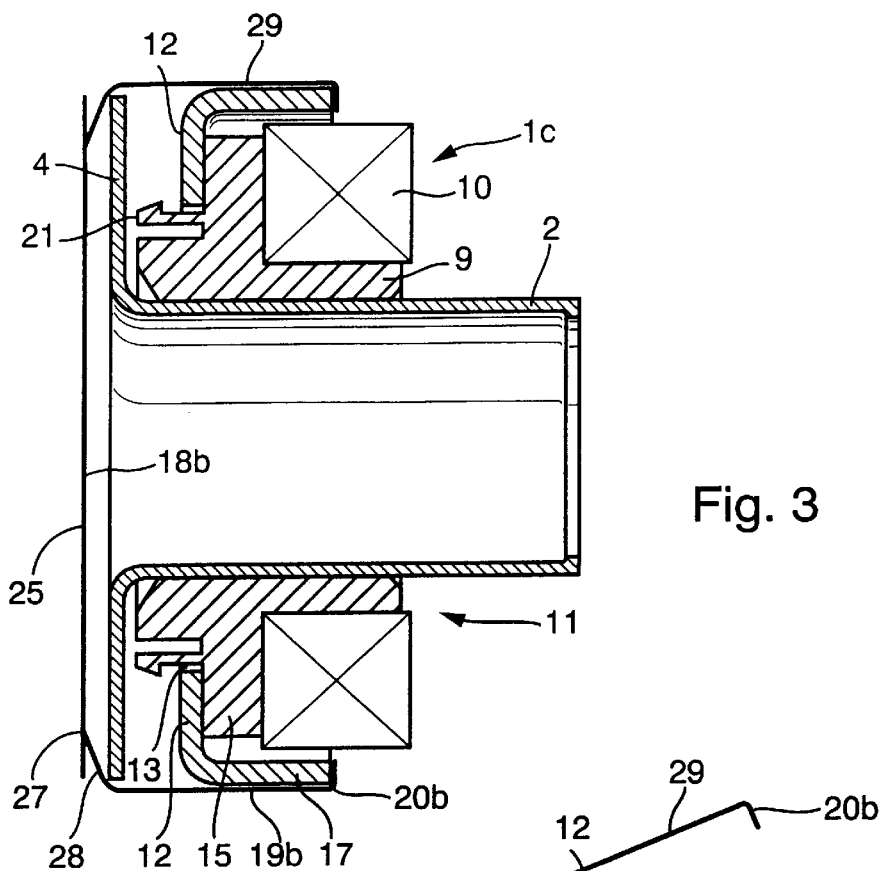
FIG. 3 shows a device with an alternative form of holding element compared with FIG. 1 and whose spring clips engage round an annular flange of the guide sleeve on the outside.
Figure 4:
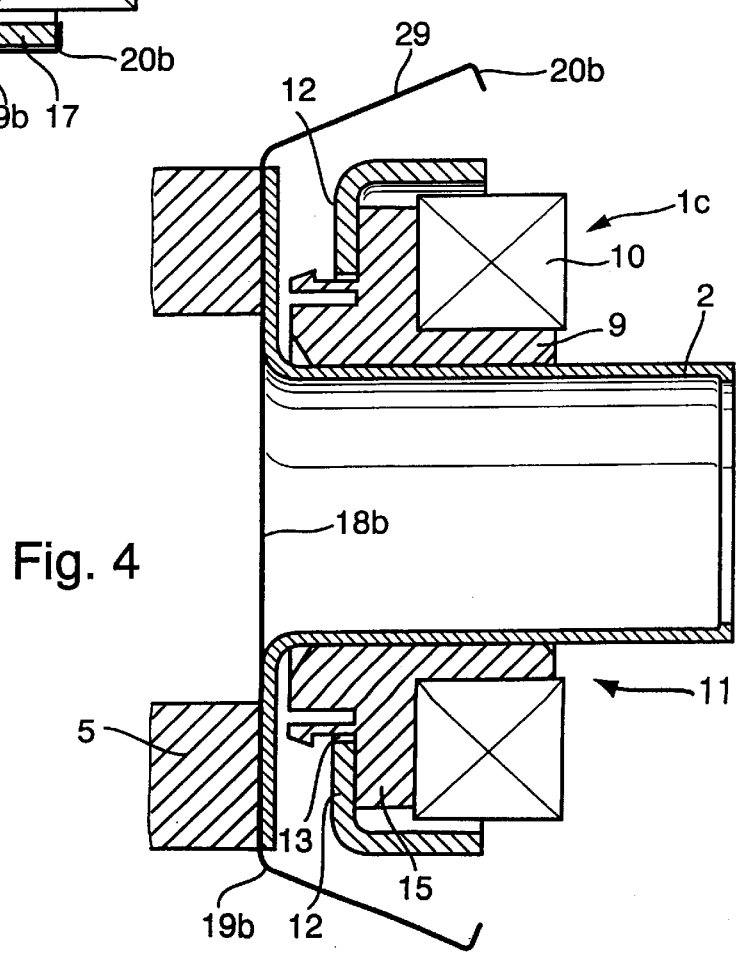
FIG. 4 shows the device according to FIG. 3 in the installation position.

FIGS. 3 and 4 show a device 1c whose component parts are brought together into one unit in the non-installed state (FIG. 3) by a holding element 18b. The structure of the holding element 18b includes spring clips 19b which each engage over the outer contour of the annular flange 4 of the guide sleeve 2 and whose edges 20b engage behind the cheeks 17 of the clutch lever 12. The structure of the holding element 18b includes the spring clips 19b which each form starting from a point of attachment 27 an inclined section 28 running at an acute angle to the contact bearing face 25 and which creates an axial gap between the contact bearing face 25 of the holding element 18b and the annular flange 4. The inclined section 28 of the spring clip 19 is adjoined by an axially aligned section 29 which is provided at the end side with the radially inwardly aligned edges 20b. As can be seen in FIG. 4, in the installed position of the device 1c the securing action of the holding element 18b is released as a result of the flush alignment produced between the section 28 and the contact bearing face 25 of the holding element 18b when the flange 4 is clamped against the gearbox housing 5.

Figure 5:
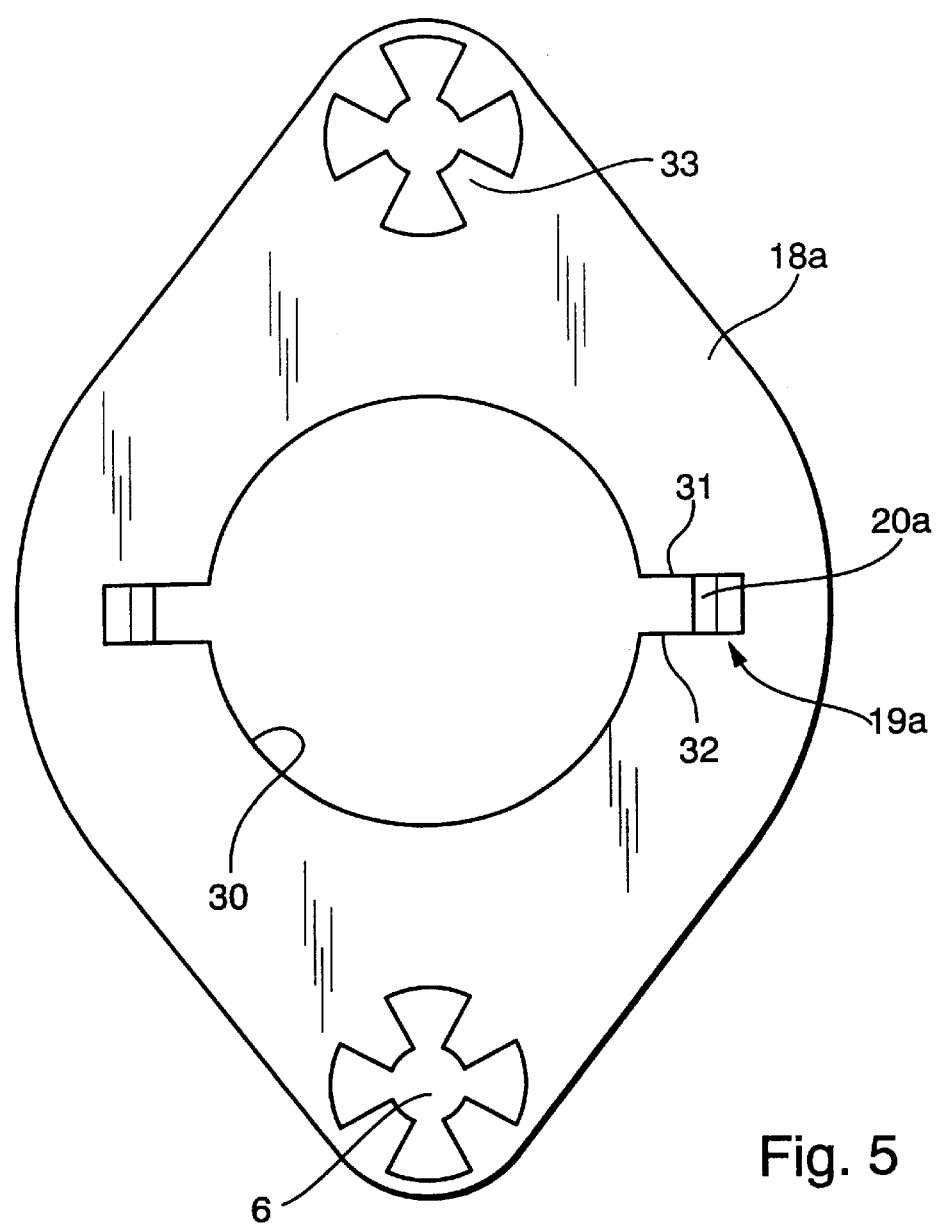
FIG. 5 shows the individual parts of the holding element illustrated in FIG. 1.

FIG. 5 shows a front view of the holding element 18a as an individual part. The basic oval shape of the holding element 18a is adapted to the support face of the annular flange 4 of the guide sleeve 2 and support face on the gearbox housing 5. In order to form the spring clips 19a two radial incisions 31, 32 are made parallel to each other in the holding element 18a starting from the inner bore 30 to form a sheet metal tab which is then shaped without stock-removal as a spring clip 19a corresponding to the shape shown in FIGS. 1, 2 and 6. The holding element 18a according to FIG. 5 is furthermore provided with securing means for the fixing screws 7 (FIG. 7). For this the bores 6 are provided with radially aligned elastic tongues 33 spread out over the circumference to allow the fixing screws 7 to be screwed in. The sheet metal thickness of the tongues 33 is adapted to the width of the thread groove of the fixing screws 7. This securing design allows on the one hand the fixing screws 7 to be securely held in the preassembled state of the device 1b, 1c and on the other this screw fixing causes no obstruction in the installed state.

Figure 6:
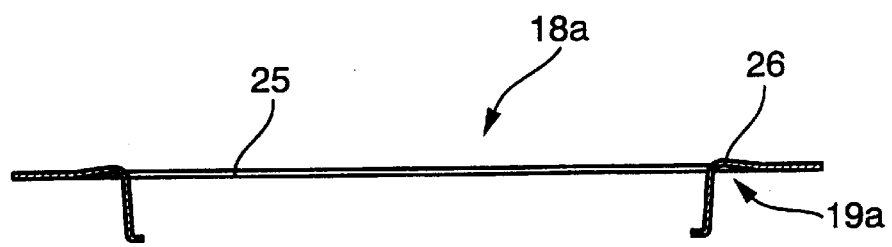
FIG. 6 is a plan view of the holding element illustrated in FIG. 5.

FIG. 6 shows a side view of the holding element 18a illustrated in FIG. 5 and shows in particular the shaping of the spring clips 19a. As already explained in the description of FIG. 1 the spring clip 19a at first forms a section 26 protruding axially from the contact bearing face 25 and then adjoined by a section aligned oppositely at right angles and having at the end a radially inwardly turned edge 20a.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A clutch-release device for operating a friction clutch arranged in a power train of a vehicle between an internal combustion engine and a manual shift transmission and surrounding a drive shaft of the transmission, the device comprising
   a release bearing which forms with a sliding sleeve a release unit;
   a locally fixed guide sleeve passing through the sliding sleeve and guiding the release unit for axial movement, the guide sleeve having an annular flange at one end;
   a clutch lever for transferring operating forces to the release bearing which in an installed state of the clutch release device is held for swivel movement in a locally fixed articulated joint;
   a holding element with which all component parts of the clutch-release device are held safe against loss;
   wherein the holding element is a disc-like holding element that is supported on the annular flange and has at least one axially protruding spring clip which engages behind a component part of the clutch-release device so that the holding action of the at least one spring clip becomes disengaged in the installed state.

2. The clutch-release device according to claim 1, wherein the holding element, in the installed state, is inserted between the annular flange of the guide sleeve and a gearbox housing.

3. The clutch-release device according to claim 1, wherein the at least one spring clip includes a free end with an angled edge which snap-fits with an elastic retaining nose arranged on a component part of the clutch-release device.

4. The clutch-release device according to claim 3, wherein the elastic retaining nose is formed on a radially separated shoulder of the sliding sleeve that is guided through a free area of the clutch lever.

5. The clutch-release device according to claim 3, wherein the spring clip is guided through a bore of the annular flange of the guide sleeve.

6. The clutch-release device according to claim 3, wherein the holding element has a contact bearing face and the at least one spring clip has a shape which, when the clutch-release device is not yet in the installed state, protrudes axially from the contact bearing face by a first section which is adjoined by an oppositely axially aligned second section of the spring clip which, in turn, is adjoined by the free end with the angled edge.

7. The clutch-release device according to claim 1, wherein the at least one spring clip comprises a free end with an angled edge which snap-fits with an elastic retaining nose mounted on the clutch lever.

8. The clutch-release device according to claim 7, wherein the at least one spring clip engages over the annular flange, and wherein further the angled edge protrudes radially inward and engages behind a cheek of the clutch lever when the clutch-release device is not yet in the installed state.

9. The clutch-release device according to claim 1, wherein the holding element is made from a sheet-metal strip material.

10. The clutch-release device according to claim 1, wherein the holding element has a contact bearing face adapted in size to the annular flange and wherein the holding element further has a central bore through which the drive shaft is passed.

11. The clutch-release device according to claim 1, wherein the holding element is centered relative to the guide sleeve by means of at least one axially protruding shoulder in the holding element which fits into a bore in the annular flange.

12. The clutch-release device according to claim 1, wherein the holding element has at least one hole with tongues protruding inward from a border of the hole, whereby the hole is adapted to secure a fastening screw when the clutch-release device is not yet in the installed state.

13. A clutch-release device for a motor vehicle friction clutch which has a release unit that includes a sleeve for surrounding a drive shaft and a sliding member which slides on the sleeve and carries a release bearing, the sleeve having one axial end shaped as an annular flange which, in an installed state of the clutch-release device, will face a clamping surface, the device comprising a resilient holding member which holds together the sliding member and the sleeve and which is constructed so that the holding action is released when the flange is clamped against the clamping surface.

* * * * *